(12) United States Patent
Hubbard

(10) Patent No.: US 7,776,177 B2
(45) Date of Patent: Aug. 17, 2010

(54) METHOD FOR INSTALLING A ROOFING MEMBRANE

(75) Inventor: Michael J. Hubbard, Maumee, OH (US)

(73) Assignee: BFS Diversified Products, LLC

( * ) Notice: Subject to any disclaimer, the term of this patent is extended or adjusted under 35 U.S.C. 154(b) by 151 days.

(21) Appl. No.: 11/786,284

(22) Filed: Apr. 11, 2007

(65) Prior Publication Data

US 2007/0187017 A1 Aug. 16, 2007

Related U.S. Application Data

(62) Division of application No. 10/775,207, filed on Feb. 11, 2004, now abandoned.

(60) Provisional application No. 60/446,277, filed on Feb. 11, 2003, provisional application No. 60/446,283, filed on Feb. 11, 2003.

(51) Int. Cl.
*B29C 65/00* (2006.01)
*B29C 65/18* (2006.01)
*B29C 65/02* (2006.01)
*E04D 5/00* (2006.01)
*E04D 5/10* (2006.01)
*E04D 5/02* (2006.01)
*E04D 1/00* (2006.01)
*E04D 11/00* (2006.01)
*E04D 11/02* (2006.01)

(52) U.S. Cl. .............. 156/300; 156/60; 156/71; 156/281; 156/297; 156/298; 156/299; 428/40.1; 428/41.8; 428/55; 428/58; 428/61; 428/141; 428/192; 428/408; 428/409

(58) Field of Classification Search .............. 428/40.1, 428/40.3, 55, 61, 141, 192, 41.8, 58, 408, 428/409; 156/60, 71, 281, 298, 297, 299, 156/300

See application file for complete search history.

(56) References Cited

U.S. PATENT DOCUMENTS

| | | | |
|---|---|---|---|
| 1,958,871 A | 5/1934 | Tucker | |
| 3,616,515 A | 11/1971 | Moore | |
| 4,038,454 A | 7/1977 | Lehmann et al. | |
| 4,091,135 A | 5/1978 | Tajima et al. | |
| 4,656,062 A | 4/1987 | Harriett | |
| 4,757,652 A | 7/1988 | Kalkanoglu | |
| 4,778,852 A | 10/1988 | Futamura | |
| 4,910,059 A | 3/1990 | Sancaktar | |
| 4,965,119 A | 10/1990 | Sancaktar | |
| 4,978,703 A | 12/1990 | Ainsworth et al. | |
| 4,996,812 A | 3/1991 | Venable | |
| 5,130,354 A | 7/1992 | Gelles | |
| 5,162,436 A | 11/1992 | Davis et al. | |
| 5,206,068 A | 4/1993 | Kalkanoglu | |
| 5,256,228 A | 10/1993 | Davis et al. | |
| 5,286,798 A | 2/1994 | Davis et al. | |
| 5,322,724 A | 6/1994 | Levens | |
| 5,365,709 A | 11/1994 | Lassiter | |
| 5,370,755 A | 12/1994 | Davis et al. | |
| 5,389,715 A | 2/1995 | Davis et al. | |
| 5,456,785 A | 10/1995 | Venable | |
| 5,469,671 A | 11/1995 | Rathgeber et al. | |
| 5,516,829 A | 5/1996 | Davis et al. | |
| 5,593,748 A | 1/1997 | Hubbard | |
| 5,605,020 A | 2/1997 | Chambers | |
| 5,695,273 A | 12/1997 | Lanning | |
| 5,711,116 A | 1/1998 | Hasan | |
| 5,737,897 A | 4/1998 | Naipawer, III | |
| H1735 H | 6/1998 | Hansen et al. | |
| 5,775,052 A | 7/1998 | Mayle | |
| 5,850,719 A | 12/1998 | Mayle | |
| 5,916,654 A | 6/1999 | Phillips et al. | |
| 6,021,616 A | 2/2000 | Mayle | |
| 6,080,458 A | 6/2000 | Russell et al. | |
| 6,131,351 A | 10/2000 | Locatelli | |
| 6,235,365 B1 | 5/2001 | Schaughency et al. | |
| 6,360,506 B1 | 3/2002 | Graae | |
| 6,464,821 B1 | 10/2002 | Phillips et al. | |
| 6,491,471 B1 | 12/2002 | Susinkas | |
| 6,500,560 B1 | 12/2002 | Kiik et al. | |
| 6,794,449 B2 | 9/2004 | Fisher | |
| 6,863,944 B2 | 3/2005 | Naipawer, III et al. | |
| 7,000,360 B1 | 2/2006 | Russell et al. | |
| 7,101,598 B2 * | 9/2006 | Hubbard | 428/40.1 |
| 2003/0008094 A1 | 1/2003 | Zickell | |
| 2003/0219564 A1 * | 11/2003 | Hubbard | 428/40.1 |

FOREIGN PATENT DOCUMENTS

| | | |
|---|---|---|
| GB | 2123843 A | 2/1984 |
| WO | WO 98/56866 | 12/1998 |

* cited by examiner

*Primary Examiner*—Sanza L McClendon
(74) *Attorney, Agent, or Firm*—Thomas R. Kingsbury; Dave Burleson

(57) ABSTRACT

A method for affixing covering products to building structures is described. The covering product includes a thermoplastic membrane, a layer in which a fabric that includes an adhesive coating, and a release liner. The layer is affixed to a primary surface of the membrane. After the covering product is transported to the building structure, the release liner is removed, and the covering produce is adhered to the building structure.

16 Claims, 3 Drawing Sheets

METHOD FOR INSTALLING A ROOFING MEMBRANE

CROSS REFERENCE TO RELATED APPLICATIONS

This is a divisional application of U.S. patent Ser. No. 10/775,207, filed 11 Feb. 2004, now abandoned, which claims the benefit of U.S. provisional appl. Nos. 60/446,277 and 60/446,283 both filed 11 Feb. 2003; the entire disclosures of these priority applications are incorporated herein by reference.

BACKGROUND INFORMATION

The present invention relates generally to covering membranes for building structures.

Roofing membranes, are currently applied to roof decks by gluing the membrane to the substrate to be used as an insulation layer or underlayment of a roofing deck using either a water-based adhesive or an solvent-based adhesive that is applied to a roofing membrane at the site of the roofing installation. However, current methods of applying water-based adhesives or solvent-based adhesives "on-site" result in several problems. For example, the application of a roofing membrane with a water-based adhesive is time consuming and may only be applied in limited climatic conditions. A solvent-based adhesive requires care in determining the state of the adhesive to avoid over drying and attempting to adhere the roofing membrane while the adhesive is still wet. Also, solvent-based adhesives have volatile organic component (VOC) problems and may be very flammable, causing safety issues.

In addition, using a thermoplastic material for roofing membranes may require an expensive adhesive.

To join two roofing membranes that have been adhered to a roof substrate, usually hot air is used to weld seams where the two membranes overlap. The seam welds are usually formed using hot air welders that typically cost several thousands of dollars, making the installation of conventional roofing systems quite expensive, even for professional installers.

SUMMARY OF THE INVENTION

The present invention overcomes the shortcomings of prior methods by providing covering membranes, such as roofing membranes, that may employ a relatively inexpensive adhesive to bond the roofing membrane to a building structure such as a roof substrate. In a preferred embodiment, the present invention provides a covering membrane that may be installed easily and quickly by a non-professional without special tools.

According to a first broad aspect of the present invention, there is provided a covering product comprising: a membrane comprising a thermoplastic; a fabric layer attached to a lower side of the membrane, the fabric layer being comprised of a fabric material; and an adhesive covering at least a portion of a lower side of the fabric layer for allowing the covering product to be adhered to a building structure.

According to second broad aspect of the invention, there is provided a method for mounting at least one membrane on a building structure comprising the following steps: (a) providing a building structure; and (b) adhering a first membrane on the building structure by using a first adhesive coated on a first fabric layer bonded to the first membrane, the first fabric layer being comprised of a first fabric material.

Other features of the present invention will be apparent from the following detailed description of the preferred embodiment.

BRIEF DESCRIPTION OF THE DRAWINGS

The invention will be described in conjunction with the accompanying drawings, in which.

DETAILED DESCRIPTION

Figure 1:
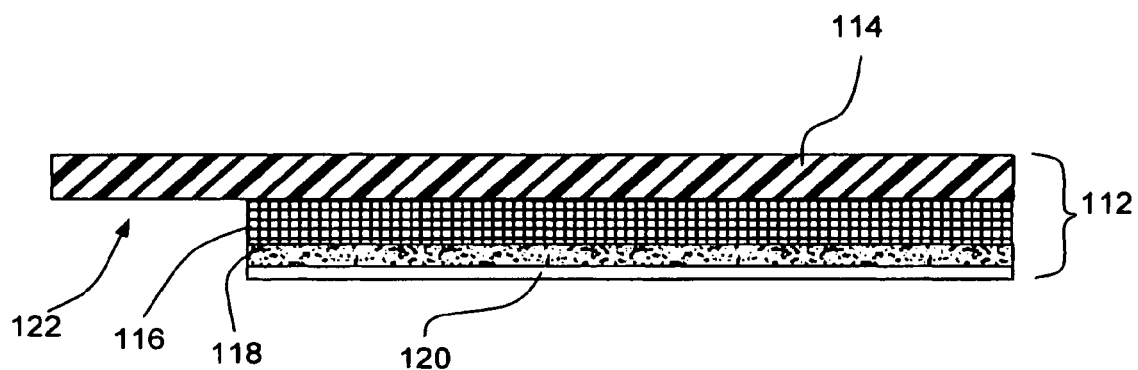
FIG. 1 is a cross-sectional view of a covering product constructed in accordance with a preferred embodiment of the present invention.

The following definitions are used throughout this application.

Where the definition of terms departs from the commonly used meaning of the term, applicant intends to utilize the definitions provided below, unless specifically indicated.

The term "building structure" refers to any building, portion of a building or other structure made of construction materials that is exposed to the elements, i.e. rain, wind, water, ice, snow, sun, etc. on a regular basis. Examples of building structures include roofs, building walls, free standing walls, sheds, chimneys, exposed pipes, culverts, above ground or underground tunnels, etc. Examples of construction materials include masonry materials such stone, brick, concrete, etc., wood, metal, insulation, plaster, plasterboard, etc.

The term "construction materials" refers to typical materials used in construction such as wood, brick, concrete, metal, insulation materials, etc.

The term "majority of a membrane" refers to more than half of the surface area of a membrane. The majority of a membrane includes one adhesive on its surface to allow the membrane to be adhered to a building structure. A second adhesive may be used to adhere the edges of the membrane to the surface of the building structure or to a second membrane overlapped by a first membrane. Also, the edges of a membrane may be left free of adhesive to allow the use of other means to fasten a membrane to a building structure.

The term "weather proofing" refers to the conventional meaning of the term weatherproofing i.e. protecting building structures such as roofs, chimneys, walls, etc. from the elements, i.e. rain, wind, water, ice, snow, sun.

The term "dead load shear capable adhesive" refers to any adhesive having the property of reliably adhering the weight of a covering membrane, such as a roofing membrane and/or building peripheral at the upper and lower service temperatures of the covering system. A dead load sheer adhesive is capable of holding 20 grams per square inch at room temperature for 2 hours. Preferred dead load sheer capable adhesives are capable of holding 50 grams per square inch at 70°

C. (158° F.) for 24 hrs. An example of a dead load shear capable adhesive is Adco PSA-3™ manufactured by Adco Products, Inc.

The term "fire retardants" or "FRs" refer to a conventional additives blended into a polymer to reduce the flammability of a polymer by slow down the rate of combustion. Examples of preferred FRs include magnesium hydroxide, brominated FR, $SbO_3$, etc.

The term "flexible" refers to any material that is capable of being bent, twisted, bowed, curved, etc. For example, a flexible material may be a material that is capable of being formed into a coil and capable of being unrolled from a coil to lie substantially flat. A flexible material may have the capability to be coiled in any direction. Alternatively, a flexible material may be a material that is capable of being repeatedly folded and unfolded. The term "flexible" refers to any material that is capable of being bent, twisted, bowed, curved, etc.

The term "horizontal" surface refers to any surface that includes a horizontal dimension, i.e. extends in a direction substantially parallel with the ground. Examples of horizontal surfaces include roof substrates, roofing membranes mounted on roof substrates, etc.

The term "roof deck" refers to the conventional meaning of the term roof deck, i.e. a structural supporting surface of a building extending between the surrounding exterior walls of the building. A roof deck may be constructed from plywood, metal decking or concrete or any other suitable material or combination of materials and may include insulation material.

The term "roof substrate" refers to the part of a roof on which a roofing membrane is mounted. The roof substrate may be constructed from plywood, metal decking or concrete or any other suitable material or combination of materials and may include insulation or other layers on which the roofing membrane is mounted.

The term "roofing membrane" refers to the conventional meaning of the term roofing membrane, i.e. a membrane that is a water impermeable sheet of polymeric material that is secured to a roof deck. A roofing membrane may use polymeric materials such as ethylene propylene diene terpolymer rubber (EPDM), chlorinated polyethylene, PVC, chlorosulfanated polyethylene, TPO, etc. The roofing membrane may be made from a blended composite polymer having additives, such as UV screeners, UV absorbers, fire retardants, etc. to improve weatherability.

The term "room temperature thermoplastic" refers to a thermoplastic that is solid at room temperature, i.e. will not cold flow at room temperature.

The term "thermoplastic" refers to the conventional meaning of thermoplastic, i.e. a compound substance that exhibits the property of a material, such as a high polymer, that softens when exposed to heat and generally returns to its original condition when cooled to room temperature. Examples of thermoplastics suitable for use include thermoplastics such as: PVC and thermoplastic polyolefins such as polyethylene (PE), linear polyethylene (LPE), polybutenes (PB), polypropylene (PP), co-polymers of polyolefins, ethylene-propylene rubber (EPR), ethylene-propylene copolymer (EPM), EPDM blended with PP or PE or copolymer, etc.

The term "thermoplastic polyolefin" (TPO) refers to the conventional meaning of the term thermoplastic polyolefin, i.e. polyolefins that are thermoplastics. Examples of TPO's that are suitable for use in the present invention include: LPE, PE, PB, PP, co-polymers, EPR or EPDM blended with PP or PE or copolymer, etc.

The term "UV absorber" refers to any conventional additive blended into a polymer to stabilize the adverse effects of light exposure, such as a loss of strength, degradation and decoloration. The use of a UV absorber may allow at least one layer of roofing membrane to exhibit good weathering characteristics. Examples of preferred UV absorbers additives include benzotriazole, benezophenones, hindered amine light stabilizers (HALS), non-interacting HALS (NOR-HALS), etc.

The term "UV screener" refers to a conventional additive blended into a polymer to reflect ultraviolet rays. Examples of preferred UV screener additives include $TiO_2$, carbon black, zinc oxide, etc.

By employing a fabric layer bonded to a thermoplastic membrane, the covering product of the present invention is able to employ cheaper adhesives than would be necessary if the roofing membrane was adhered to a roof substrate directly. For example, several relatively cheap adhesives will not bond to a thermoplastic membrane. Other adhesives will react with some types of thermoplastic membranes thereby weakening the adhesives. Other adhesives may react with the monomeric plasticizer present in a PVC roofing membrane. Additionally, the fabric layer also allows lesser amounts of many types of adhesives to be used to adhere a membrane to a roof substrate due to the way that the surface of the fabric material interacts with the surface of the roof substrate. For example, when a roof substrate has a rough surface, a fleece or other type of fabric layer is able to more easily conform to the surface of the roof substrate than a thermoplastic membrane is able to conform to the surface of the roof substrate by itself. Furthermore, a fabric layer is able to provide protection to the membrane from any residual asphalt present on a roof substrate.

FIG. 1 illustrates a section of a covering product 112 of the present invention that includes a thermoplastic membrane 114 to which is adhered a fabric material 116. An adhesive 118 is coated on fabric material 116 and a release liner 120 covers adhesive 118. An exposed section 122 of membrane 114 is left uncovered by fabric material 116.

Figure 2:
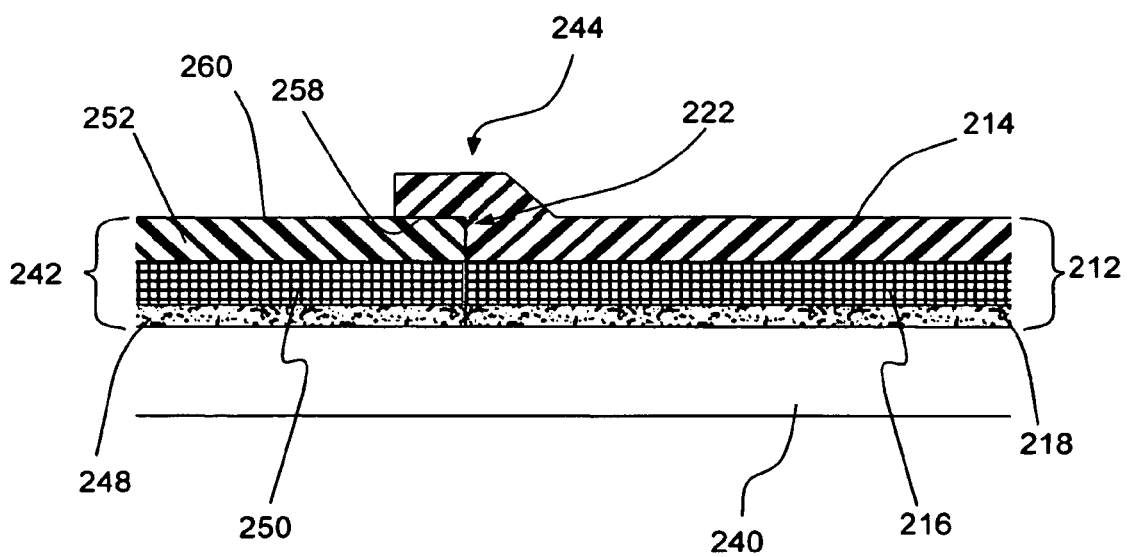
FIG. 2 is a cross-sectional view illustrating two roofing membranes mounted on a roof substrate.

FIG. 2 illustrates a section of a roofing product 212 of the present invention that includes a thermoplastic roofing membrane 214 to which is adhered a fabric material 216. An adhesive 218 is coated on fabric material 216 and a release liner (not shown) was removed from adhesive 218. An exposed section 222 of roofing membrane 214 is left uncovered by fabric material 216. Roofing product 212 mounted on a roof substrate 240 so that covering product 212 overlaps a second covering product 242 at an overlap region 244. Release liner (not shown) has been removed from adhesive 218 so that roofing product 212 may be adhered to roof substrate 240 by adhesive 218. Similarly, a release liner (not shown) has been removed from an adhesive 248 coated on a fabric material 250 bonded to a roofing membrane 252 of roofing product 242 to allow roofing product 242 to be adhered to roof substrate 240. Exposed section 222 of roofing membrane 214 is hot air welded to an overlapped section 258 of an upper surface 260 of roofing membrane 252.

Figure 3:
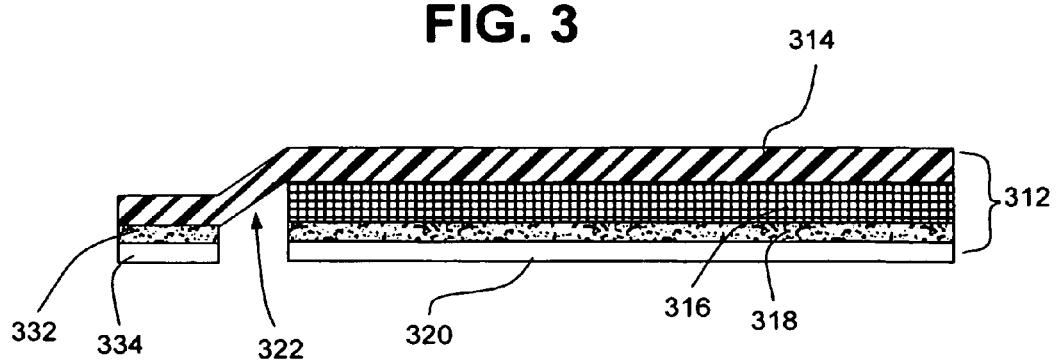
FIG. 3 is a cross-sectional view of a covering product constructed in accordance with a preferred embodiment of the present invention.

FIG. 3 illustrates a section of a covering product 312 of the present invention that includes a thermoplastic membrane 314 to which is adhered a fabric material 316. An adhesive 318 is coated on fabric material 316 and a release liner 320 covers adhesive 318. An exposed section 322 of membrane 314 is left uncovered by fabric material 316 and a pressure sensitive adhesive 332 is applied directly to a portion of exposed section 322. A release liner 334 covers adhesive 332.

Figure 4:
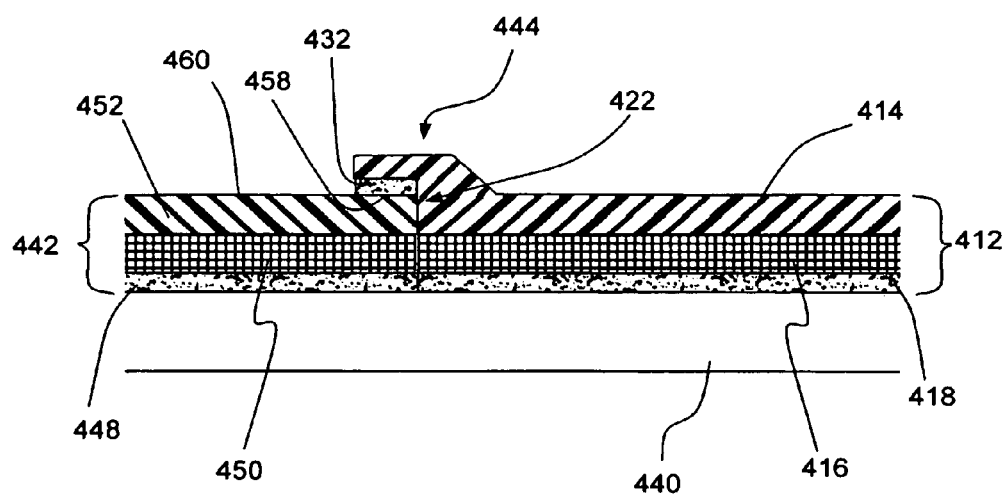
FIG. 4 is a cross-sectional view illustrating two roofing membranes mounted on a roof substrate.

FIG. 4 illustrates a section of a roofing product 412 of the present invention that includes a thermoplastic roofing membrane 414 to which is adhered a fabric material 416. An adhesive 418 is coated on fabric material 416 and a release liner (not shown) was removed from adhesive 418. An exposed section 422 of roofing membrane 414 is left uncovered by fabric material 416 and a pressure sensitive adhesive 432 is applied directly to a portion of exposed section 422. A release liner (not shown) is removed from adhesive 432. Roofing product 412 is mounted on a roof substrate 440 so that roofing product 412 overlaps a second roofing product 442 at an overlap region 444. Release liner (not shown) has been removed from adhesive 418 so that roofing product 412 may be adhered to roof substrate 440 by adhesive 418. Similarly, a release liner (not shown) has been removed from an adhesive 448 coated on a fabric material 450 bonded to a roofing membrane 452 of roofing product 442 to allow roofing product 442 to be adhered to roof substrate 440. Release liner (not shown) has been removed from adhesive 432, to allow exposed section 422 of roofing membrane 414 to be adhered to an overlapped section 458 of an upper surface 460 of roofing membrane 452.

Figure 5:
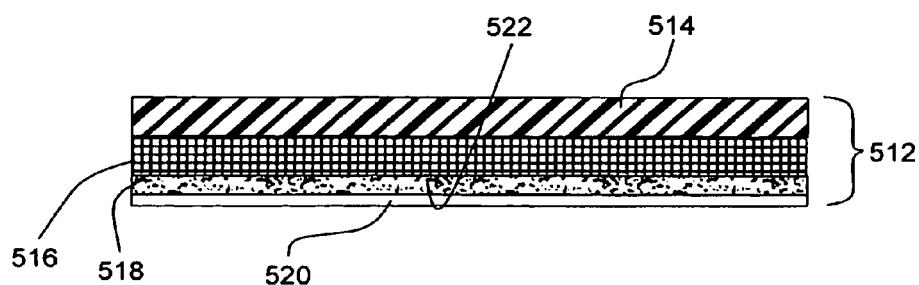
FIG. 5 is a cross-sectional view of a covering product constructed in accordance with a preferred embodiment of the present invention.

FIG. 5 illustrates a section of a covering product 512 of the present invention that includes a thermoplastic membrane 514 to which is adhered a fabric material 516. An adhesive 518 is coated on fabric material 516 and a release liner 520 covers adhesive 518. Adhesive 518 covers an entire lower surface 522 of fabric material 516.

Figure 6:
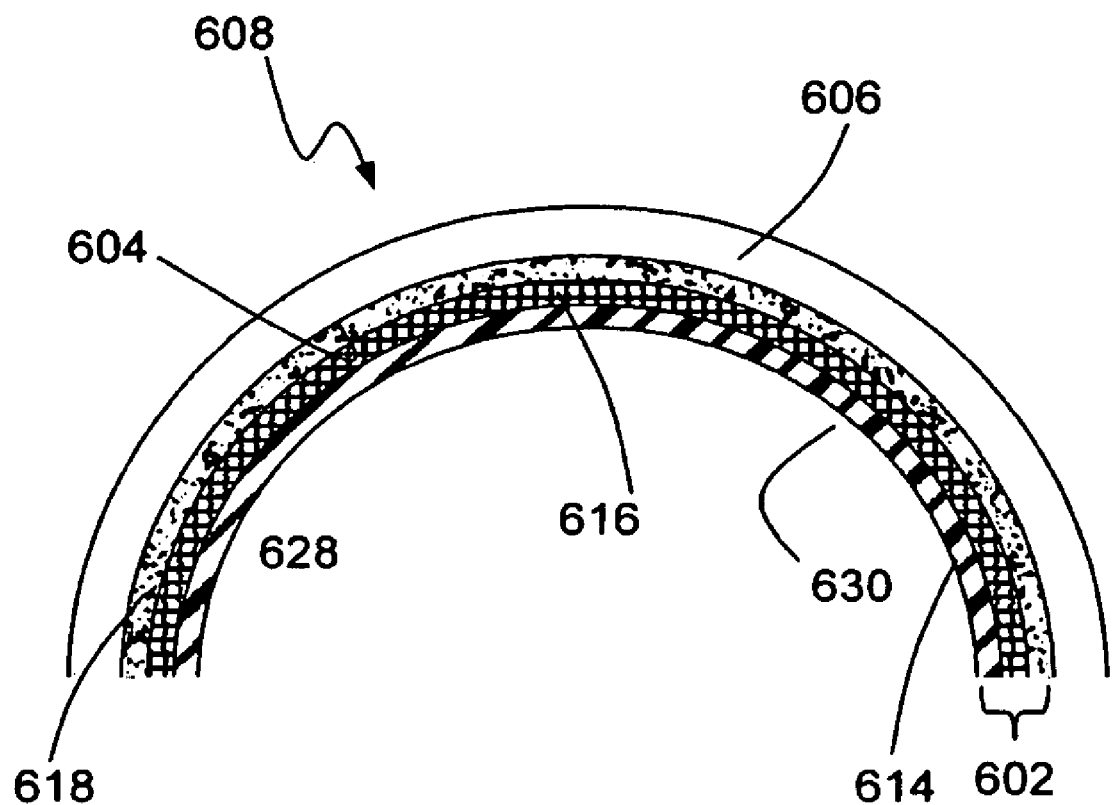
FIG. 6 is a cross-section view of a covering product of the present invention mounted on the upper surface of a tunnel.

FIG. 6 illustrates in simplified form a section of a covering product 622 that is applied to an underside 604 of an upper portion 606 of a tunnel 608. Covering product 602 includes a thermoplastic membrane 614 to which is adhered a fabric material 616. An adhesive 618 is coated on fabric material and adheres covering product 602 to tunnel 608. Prior to adhering membrane 612 to tunnel 608, adhesive 618 is covered by a release liner (not shown).

Although for simplicity, only a single membrane is shown being used in the embodiment of FIG. 6, a series of overlapping membranes may also be used to cover the interior of a tunnel.

Preferred pressure sensitive adhesives for coating on a fabric layer include styrene-butadiene adhesives such as Kraton™ adhesives (manufactured by the Shell Oil Company), amorphous polypropylene, and various other types of adhesives that allow a fabric material to be adhered to a roof substrate. The thickness of the coating of pressure sensitive adhesive may vary depending on the type of fabric material employed and the type of adhesive used.

A preferred dead load shear capable adhesive for use with the covering system and flashing is Adco PSA-3™ manufactured by Adco Products, Inc. Adco PSA-3™. Adco PSA-3™ is a pressure sensitive adhesive composition comprising styrene-ethylene-butylene-styrene (SEBS), a tackifying endblock resin such as a cumarone-indene resin and a tackifying midblock resin such as a terpene resin. Other preferred dead load shear capable adhesives include: butyl-based adhesives, EPDM-based adhesives, acrylic adhesives, styrene-butadiene adhesives, polyisobutylene adhesives, ethylene vinyl acetate adhesives, etc.

One type of dead load shear capable adhesive may be used for all of the roofing membranes and roofing peripherals of a system, or different adhesives may be used for different components. Also, different adhesives may be used on different sections of a component. For example, a stronger adhesive or a more moisture resistant adhesive may be used to adhere two overlapping membranes to each other while a weaker and possibly cheaper adhesive may be used to adhere the non-overlapping portion of the roofing membrane to a roof substrate.

A preferred thickness of a dead load shear capable adhesive may be 0.001 to 0.5 cm. A more preferred thickness of a dead load shear capable adhesive may be 0.01 to 0.25 cm. Yet another more preferred thickness of a dead load shear capable adhesive may be 0.1 to 0.2 cm.

The fabric layer is preferably a non-woven or woven polyester fleece, a fleece made from non-woven or woven polyethylene or polypropylene, or other common fabric materials. The fabric layer may be bonded to the roofing membrane using conventional methods. The thickness of the fabric layer may be varied depending on the surface texture of the roof substrate on which a roofing membrane is to be mounted.

The exposed section of the roofing membrane is preferably about 2.54 cm (1 in.) to 15.24 cm (6 in.) wide.

The release liners used to cover the adhesive coated on the fabric material and/or the adhesive coated on an exposed section of a roofing membrane may be made of any suitable release liner material such as waxed paper, plastic, etc. Using a pressure sensitive adhesive and release liner allows easier storage and transportation of a roofing membrane. The use of a release liner or liners allows for the roofing membrane to be stored and transported as a roll.

Although only a few ways of bonding an overlapping exposed section of a roofing membrane to an upper side of an overlapped roofing membrane are shown in the drawing figures and described above, other methods of joining two roofing membranes may be used. For example, instead of directly hot air welding an overlapping exposed section of one roofing membrane to an overlapped section of another roofing membrane, a hot melt adhesive may be applied to the underside of the overlapping section or the upper side of the overlapped section by spraying or knife coating methods. A hot melt adhesive layer may also be co-extruded with a roofing membrane in the region of the exposed section of the roofing membrane.

In other alternative embodiments, a transfer adhesives, an solvent based adhesive, or a water based adhesive may be applied to the underside of the overlapping section or the upper side of the overlapped section by traditional adhesive coating methods.

In another alternative embodiment, an overlapping section of one roofing membrane may be chemically welded to an overlapped section of a second roofing membrane using known techniques.

Although for convenience, the covering product of the present invention is only described above as being applied from above to a horizontal surface or from below to a curved surface, the covering product may also be used on slanted surfaces, such as slanted or peaked roofs, vertical surfaces, such as walls, chimneys, etc., curved surfaces such as culverts, or contoured surfaces, such as terra cotta roofs, or may be applied from below to horizontal and vertical surfaces such as roof overhangs or various curved or contoured surfaces.

The membrane of the present invention may be colored to be less noticeable when applied to a building structure.

Also, although only a few types of building structures are depicted as being covered in the embodiments of the present invention described above and illustrated in the drawings, the covering products of the present invention drawings, the covering products of the present invention may be used on a variety of building structures.

Although the present invention has been fully described in conjunction with the preferred embodiment thereof with reference to the accompanying drawings, it is to be understood that various changes and modifications may be apparent to those skilled in the art. Such changes and modifications are to be understood as included within the scope of the present invention as defined by the appended claims, unless they depart therefrom.

That which is claimed is:

1. A method for affixing a covering product to a building structure comprising:
   a) providing a covering product comprising
      (i) a thermoplastic membrane having first and second primary surfaces,
      (ii) a layer comprising a fabric bearing an adhesive disposed on and at least partially in said fabric, said layer being disposed on and affixed to said first primary surface with the proviso that a portion of said first primary surface adjacent each edge remains uncovered by said fabric, and
      (iii) overlying said adhesive-bearing fabric layer, a release liner,
   b) transporting said covering product to said building structure;
   c) removing said release liner; and
   d) adhering said covering product to said building structure.

2. The method of claim 1 wherein said covering product is disposed on a roll core during said transporting step.

3. The method of claim 2 wherein said covering product is unrolled prior to said covering product being adhered to said building structure.

4. The method of claim 1 wherein said adhesive comprises a styrene-ethylene-butylene styrene copolymer.

5. The method of claim 1 wherein said thermoplastic membrane is provided from materials that comprise poly(vinyl chloride).

6. The method of claim 1 wherein said layer of said covering product comprises a non-woven fabric.

7. The method of claim 1 wherein at least the second primary surface of said thermoplastic membrane comprises a material capable of absorbing or screening UV radiation.

8. The method of claim 1 wherein said thermoplastic membrane comprises a fire retardant.

9. The method of claim 1 further comprising
   e) providing a second covering product substantially similar to said first covering product;
   f) adhering said second covering product to said building structure such that an uncovered portion of the first primary surface of said second covering product overlaps a portion of the second primary surface of the thermoplastic membrane of said first covering product; and
   g) joining said first primary surface of said second covering product to said second primary surface of said first covering product.

10. The method of claim 9 wherein said first primary surface of said second covering product is hot air welded to said second primary surface of said first covering product.

11. The method of claim 9 wherein said second covering product is unrolled from a core prior to being adhered to said building structure.

12. The method of claim 9 wherein the adhesive of said second covering product comprises a styrene-ethylene-butylene styrene copolymer.

13. The method of claim 9 wherein the thermoplastic membrane of said second covering product is provided from materials that comprise poly(vinyl chloride).

14. The method of claim 9 wherein said layer of said second covering product comprises a non-woven fabric.

15. The method of claim 9 wherein at least the second primary surface of said thermoplastic membrane of said second covering product comprises a material capable of absorbing or screening UV radiation.

16. The method of claim 9 wherein said thermoplastic membrane of said second covering product comprises a fire retardant.

* * * * *